US009116262B2

(12) United States Patent
Kang et al.

(10) Patent No.: US 9,116,262 B2
(45) Date of Patent: Aug. 25, 2015

(54) HIGH-EFFICIENCY ILLUMINATION SYSTEM

(75) Inventors: Jin U. Kang, Ellicott City, MD (US);
Seth D. Billings, Pellston, MD (US);
Peter L. Gehlbach, Monkton, MD (US);
James T. Handa, Baltimore, MD (US);
Yong Huang, Baltimore, MD (US);
Russell H. Taylor, Severna Park, MD (US); Yi Yang, Greensboro, NC (US)

(73) Assignee: The Johns Hopkins University, Baltimore, MD (US)

( * ) Notice: Subject to any disclaimer, the term of this patent is extended or adjusted under 35 U.S.C. 154(b) by 86 days.

(21) Appl. No.: 13/642,436

(22) PCT Filed: Apr. 20, 2011

(86) PCT No.: PCT/US2011/033236
§ 371 (c)(1),
(2), (4) Date: Oct. 19, 2012

(87) PCT Pub. No.: WO2012/011988
PCT Pub. Date: Jan. 26, 2012

(65) Prior Publication Data
US 2013/0033887 A1    Feb. 7, 2013

Related U.S. Application Data

(60) Provisional application No. 61/325,931, filed on Apr. 20, 2010.

(51) Int. Cl.
*G02B 6/42*      (2006.01)
*F21V 8/00*      (2006.01)

(52) U.S. Cl.
CPC ............ *G02B 6/0006* (2013.01); *G02B 6/0031* (2013.01); *G02B 6/4214* (2013.01); *G02B 6/4298* (2013.01)

(58) Field of Classification Search
CPC .......... F21V 2008/00; F21V 2008/001; F21V 2008/002; G02B 6/0006; G02B 6/0008; G02B 6/4204; G02B 6/4206; G02B 6/4214; G02B 6/4298; G02B 6/0013; G02B 6/0031; G02B 6/42
USPC .......................................... 362/551, 555, 581
See application file for complete search history.

(56) References Cited

U.S. PATENT DOCUMENTS 4,241,382 A * 12/1980 Daniel .......................... 362/581
5,175,783 A * 12/1992 Tatoh .............................. 385/93
5,390,265 A *  2/1995 Jiao ................................ 385/15

(Continued)

FOREIGN PATENT DOCUMENTS

JP        06-088922 A      3/1994
JP      2001-083357 A      3/2001
WO   WO-2009/125455 A1   10/2009

*Primary Examiner* — Alan Cariaso
(74) *Attorney, Agent, or Firm* — Venable LLP; Henry J. Daley; Laura G. Remus

(57) ABSTRACT

An illumination system includes a light source, an optical waveguide that has a proximal end and a distal end such that the proximal end is arranged to receive light from the light source and the distal end is suitable to illuminate an object of interest; and an optical coupler constructed and arranged to couple light from the light source into the optical waveguide. The optical coupler includes a reflective surface that reflects at least some light diverging from the light source to be coupled into the optical waveguide.

26 Claims, 9 Drawing Sheets

(56) References Cited

U.S. PATENT DOCUMENTS

| | | |
|---|---|---|
| 5,734,766 A | 3/1998 | Flint |
| 6,257,773 B1 | 7/2001 | Moriyama et al. |
| 6,272,269 B1 * | 8/2001 | Naum .................... 385/43 |
| 2005/0117366 A1 | 6/2005 | Simbal |

* cited by examiner

HIGH-EFFICIENCY ILLUMINATION SYSTEM

CROSS-REFERENCE OF RELATED APPLICATION

This application claims priority to U.S. Provisional Application No. 61/325,931 filed Apr. 20, 2010, the entire contents of which are hereby incorporated by reference and is a U.S. national stage application under 35 U.S.C. §371 of PCT/US2011/033236 filed Apr. 20, 2011, the entire contents of which are incorporated herein by reference.

This invention was made with Equinox Corporation Grant No. 104029, a part of subcontract awarded by the Department of Defense and Grant No. R01EB007969, awarded by the Department of Health and Human Services, The National Institutes of Health. The U.S. Government has certain rights in this invention.

BACKGROUND

1. Field of Invention

The field of the currently claimed embodiments of this invention relates to illumination systems, and more particularly to high-efficiency illumination systems.

2. Discussion of Related Art

Conventional illumination systems that illuminate through a waveguide or light pipe, such as endoscopic illumination systems, use bulky, high-intensity white light sources, such a xenon light sources. Xenon sources are inefficient in producing white light and conventional endoscopic illumination systems are inefficient in coupling the light that is produced into the light pipe. Such illumination systems are thus very bulky, inefficient and require relatively large power sources.

Light emitting diodes (LEDs) are compact and efficient light sources. However, LEDs are Lambertian light sources. The light emitted from the LED surface is non-directive and incoherent. Coupling such light with high efficiency into an endoscopic fiber optic light pipe is difficult, especially for a small gauge light pipe where the coupling efficiency is usually no more than a few percent.

Current commercial products, such as the CARCLO FIBER coupling lens, uses a parabolic-shape based design to collimate LED light into a large fiber optical cable with the diameter ranging from 8 to 12 mm; the average efficiency is 85%. Fraen Fiber Light Injector (FFLI) for LUXEON™ LEDs uses a similar design to couple light into 7-9 mm diameter fiber bundle or light pipe. The efficiency is 82% at the highest. However, there is a lack of highly efficient illumination systems that have smaller diameter light pipes, such as about 1 mm and smaller.

Therefore, there remains a need for improved illumination systems and optical couplers for efficient and compact illumination systems.

SUMMARY

An illumination system according to some embodiments of the current invention includes a light source; an optical waveguide that has a proximal end and a distal end such that the proximal end is arranged to receive light from the light source and the distal end is suitable to illuminate an object of interest; and an optical coupler constructed and arranged to couple light from the light source into the optical waveguide. The optical coupler includes a reflective surface that reflects at least some light diverging from the light source to be coupled into the optical waveguide.

An optical coupler for an illumination system according to some embodiments of the current invention includes a reflective surface; a light source attachment portion structured to receive and electrically connect a light-emitting diode (LED) and hold said LED substantially in a predetermined position relative to the reflective surface; and an optical waveguide attachment portion adapted to receive an optical waveguide and hold an end of the optical waveguide substantially in a predetermined position relative to the reflective surface. The reflective surface reflects at least some light diverging from the LED to be coupled into the optical waveguide.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "light" as used herein is intended to have a broad meaning to cover both visible and non-visible regions of the electromagnetic spectrum. For example, infrared and ultraviolet light is intended to be within the definition of the term light as well as light within the visible region of the electromagnetic spectrum. The term optical waveguide is intended to be general to include anything that one would consider to be a light pipe, an optical fiber, a bundle of optical fibers or any other structure that channels the light of interest from the source to be emitted at the distal end of the optical waveguide.

Some embodiments of illumination systems according to the current invention can provide high coupling efficiency, on the order to tens of percent for small diameter light pipes, which can reduce the requirement for the use of ultra-high power LEDs. This can also reduce the overall cost of the illumination system according to some embodiments of the current invention.

In an embodiment of the current invention, we have developed a simple, cost-effective and highly efficient endoscopic illumination system using multi-spectrum LEDs. An embodiment of our system uses an ellipsoidal mirrored cavity to mix and couple the light from a plurality of LEDs into an endoscopic fiber optic illuminator at a high efficiency. The output light spectrum can be either manually toned or computer-controlled. Our illumination system can improve the coupling efficiency with LED sources and reduce the cost associated with high-power LED light sources and endoscopic light sources. For a 7 mm (diameter) light pipe or fiber bundle, the efficiency is about 82% from simulations. When the diameter was increased to 12 mm, the efficiency increased to 90%. Some embodiments of the current invention not only maintain high efficiency for large diameter fibers, but also can provide relatively high efficiencies for small diameter light pipes, for which there is a need in the market. The efficiency for a 1 mm (diameter) light pipe is about 19% according to an embodiment of the current invention.

Figure 1:
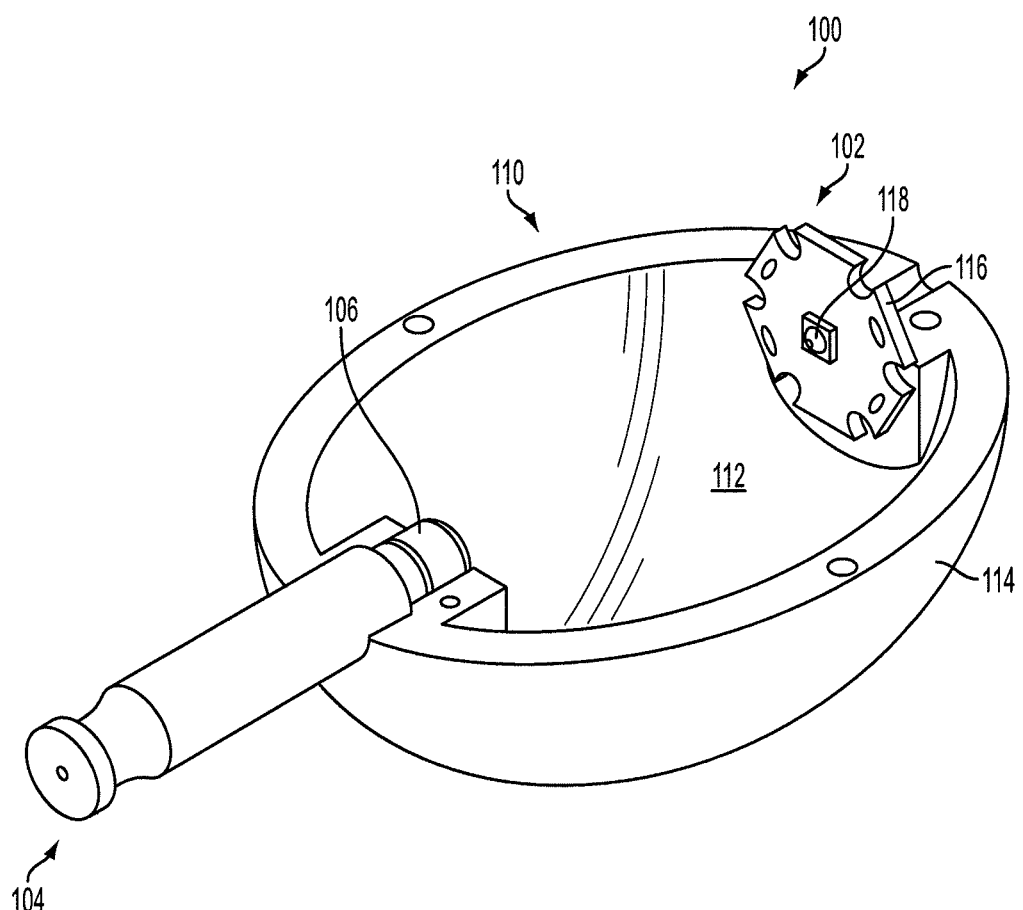
FIG. 1 shows a perspective, cut-away view of an illumination system according to an embodiment of the current invention.
Figure 2:
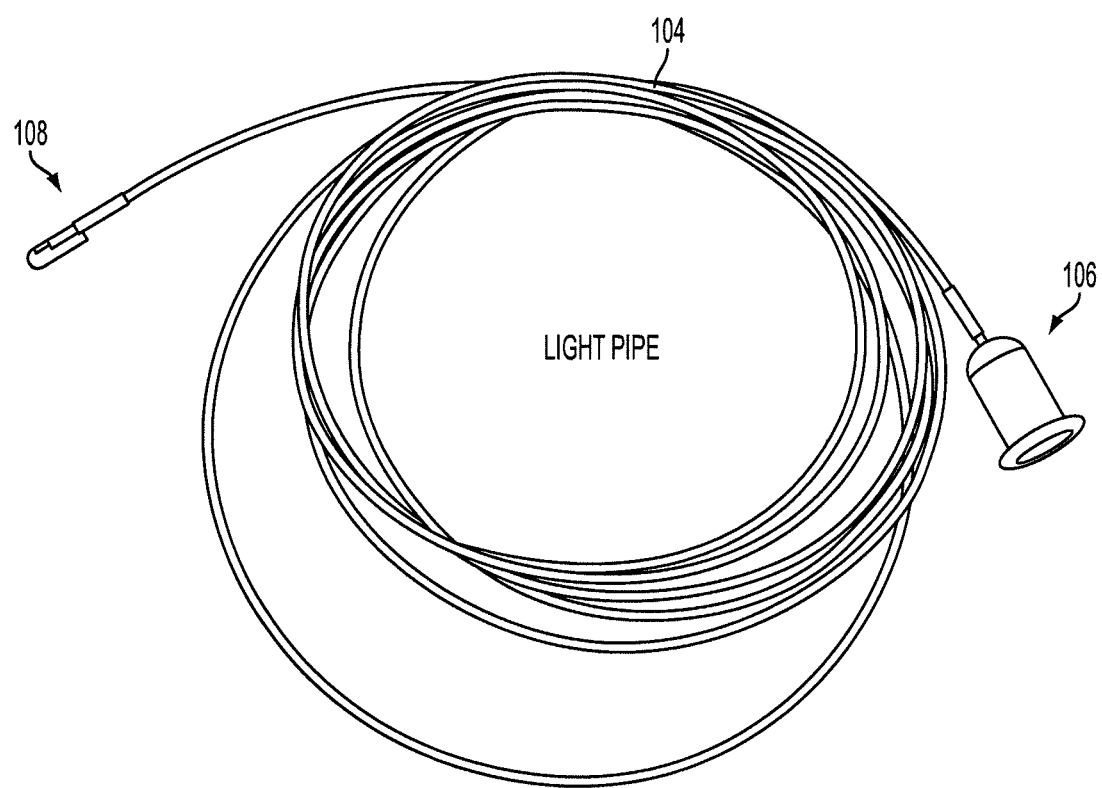
FIG. 2 shows an optical waveguide according to an embodiment of the current invention.

FIG. 1 is an illustration of an illumination system 100 according to an embodiment of the current invention. The illumination system 100 includes a light source 102 (see also FIG. 2), an optical waveguide 104 having a proximal end 106 and a distal end 108, and an optical coupler 110 constructed and arranged to couple light from the light source 102 into the optical waveguide 104. The optical coupler 110 includes a reflective surface 112 that reflects at least some light diverging from the light source 102 to be coupled into the optical waveguide 104. In FIG. 1, one half-section of the component of the optical coupler 110 that includes the reflective surface 112 is shown removed to show the inner structure. In this example, the optical coupler 110 is completed by attaching the second half-section by any suitable fastening means, such as, but not limited to, snap fastening, screw fastening, bolting, clamping and/or attaching with adhesive. The reflective surface 112 is a mirror surface that provides specular reflection according to some embodiments of the current invention. In the example of FIG. 1, the optical coupler has a structural component 114 that defines a cavity therein.

Figure 3:
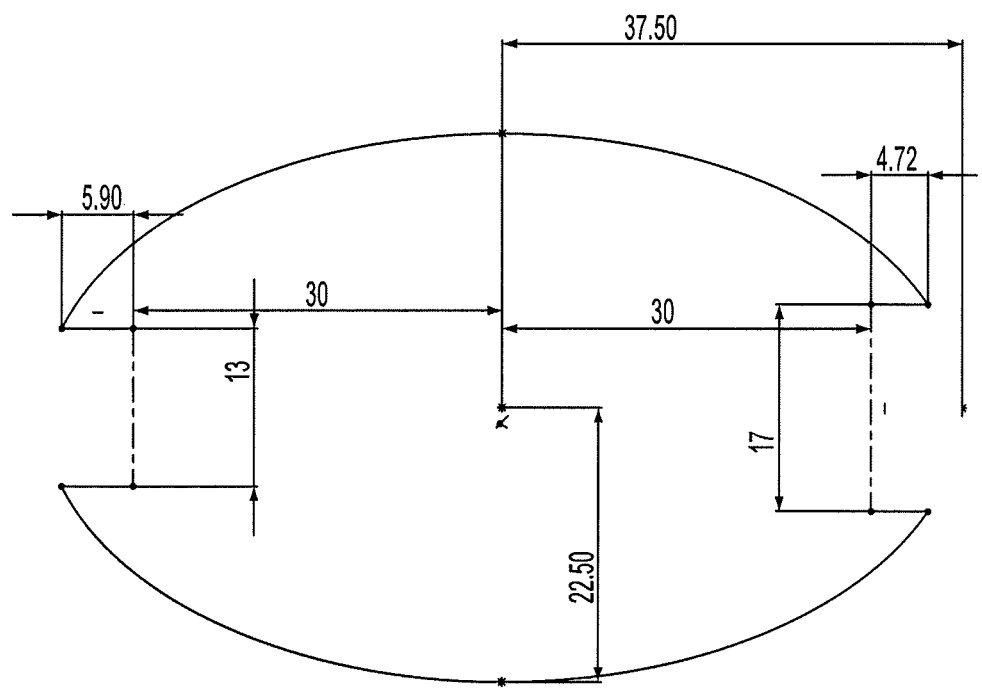
FIG. 3 is a cross sectional view of a reflecting surface according to an embodiment of the current invention.

FIG. 3 shows an example of particular dimensions for such a cavity, in millimeters, in a cross sectional view. The length of the long axis is 7.5 cm and the short axis is 4.5 cm. There are two openings, one at each end of the long axis. The wall of each opening is embedded with screw threads in order to fix a light source adaptor and an optical waveguide adaptor that will be described in more detail below.

One or more coatings of materials can be applied to the inner cavity to provide the reflective surface 112 in some embodiments of the current invention. In other embodiments, the structural component can be made from a material, such as a metal, that can be polished to provide the reflective surface 112. In another embodiment, rather than providing reflective surface 112 on the inner surface of a chamber, it can be the outer surface of a solid. For example, a solid, such as a glass or other material that has suitable optical properties, can be formed into the desired shape and then one or more layers of material can be coated on the outer surface to form reflective surface 112. The reflective surface 112 can also be the interface of two solid components, either with, or without, coating layers between the two solids.

The reflective surface 112 has a shape such that light that diverges from a source region is redirected to converge in a coupling region. The reflective surface 112 is approximately an ellipsoidal surface in some embodiments of the current invention. The term "approximately" is used for several reasons. First, the precision of the surface relative to an exact ellipsoidal surface can be selected based on the need in the particular case. In addition, an ellipsoidal surface may be optimal for a point source, but the light source 102 will have a finite dimension, as will the proximal end 106 of the waveguide 104. As the distance between the light source 102 and the proximal end 106 of the waveguide 104 increases, they better approximate a point source and a point coupler. However, in that case the coupler may become larger than desired. Therefore, in some cases, it may be desirable to deliberately deviate from an exact ellipsoid due to the use of non-point sources, to compensate for wavelength-dependent effects and/or to take into account additional structures that may also be present. Therefore, when we say that the reflecting surface is approximately ellipsoidal we mean that it has the general characteristic of refocusing in one region a substantial fraction of light that diverged from a source in another region. A substantial fraction could be 50%, 60% or 70% in some applications, for example, or may be 80%, 90% or more in other applications.

The light source 102 can be a light emitting diode (LED) according to an embodiment of the current invention. In some embodiments, the light source 102 can include a plurality of LEDs. For example, for white light illumination, the light source can have at least at least one red, blue and green LED. However, the invention is not limited to this particular example. One, two, three or more different types of LEDs can be used. In other embodiments, an infrared LED could be used instead or in combination with one or more LEDs that emit in the visible range. In other embodiments, ultraviolet LEDs can be used either alone or in combination with one or more LED in other regions of the electromagnetic spectrum. These light sources can be used for the purpose of observation by an user or to be detected by sensors, can be for interacting with other materials in certain ways, such as fluorescence, or could be used to deliver energy such as for a therapeutic effect. Therefore, the light source 102 could have combinations of LEDs to achieve more than one purpose.

Figure 4:
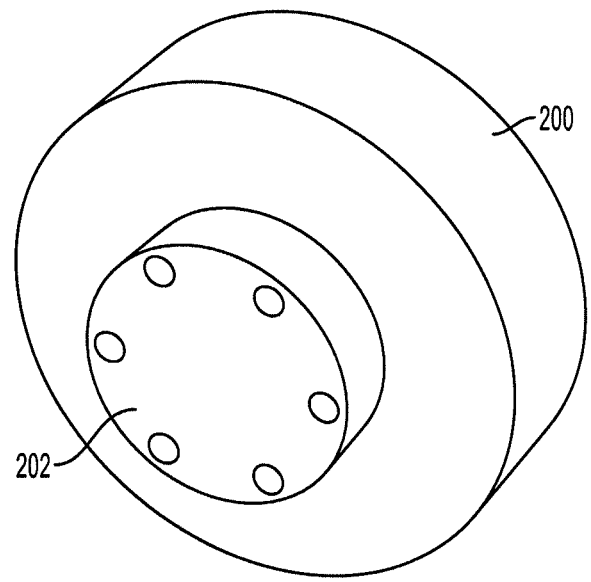
FIG. 4 is a drawing showing a light source adapter according to an embodiment of the current invention.

In an embodiment of the current invention, the optical coupler 110 can also include a light source adapter 116 having an LED attachment portion 118 adapted to receive and electrically connect a plurality of LEDs. The light source adapter 116 is structured to be attached within the optical coupler 110 at a position that enhances efficiency of coupling light from the plurality of LEDs into the optical waveguide 104. FIG. 4 shows an embodiment of a light source adapter 200 that has an attachment end 202 such that it can be attached within the optical coupler 110 in a fixed position relative to the reflective surface 112. The light source adapter 116 can also have a similar attachment end. The attachment end 202 can attach within the optical coupler 110 by any suitable means, such as a snap connection, screw fasteners, clamps, adhesive, and the like. In the example of FIG. 4, the holes are threaded to tighten the LED to the adaptor using screws. The outside of the 3.72 mm head is also threaded so that it can be screwed into the elliptical mirror precisely. The whole adaptor is made of metal, serving as a heat sink.

Figure 5:
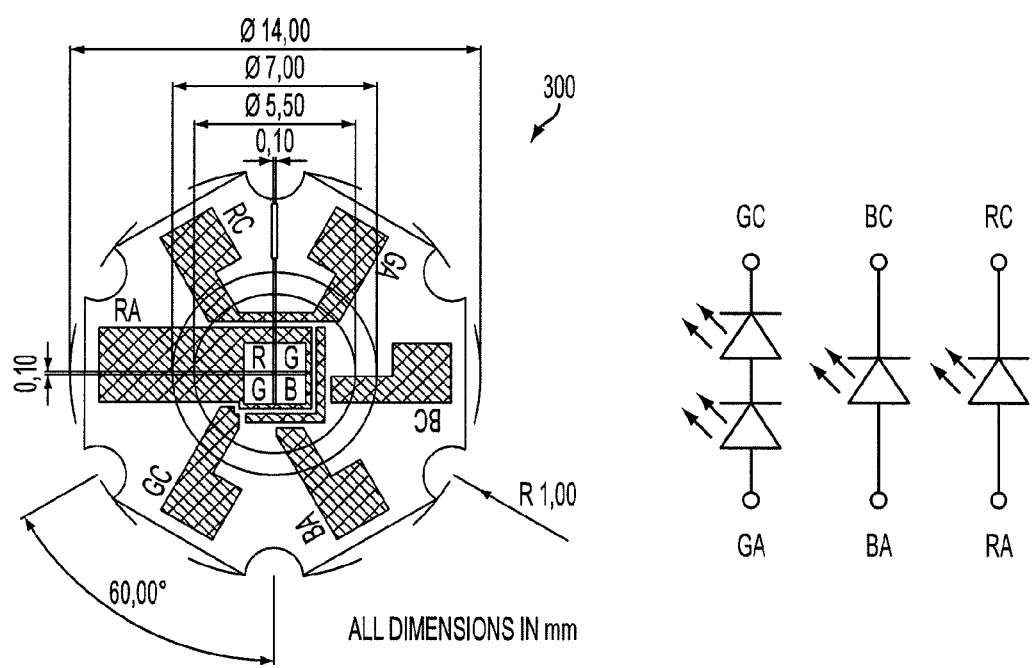
FIG. 5 is a drawing showing a light source adapter according to another embodiment of the current invention.

FIG. 5 shows a more detailed view of a light source adapter 300. The light source adapters 116 and 200 could be similar or substantially the same as light source adapter 300 in some embodiments. The light source adapter 300 shows four LEDs attached to it and electrically connected. In this example, the four LEDs are a red LED (R), two green LEDs (G) and a blue LED (B). One should note, however, that the concepts of the current invention are not limited to this particular example.

One could arrange various numbers and combinations of LEDs depending on the particular application.

Figure 6:
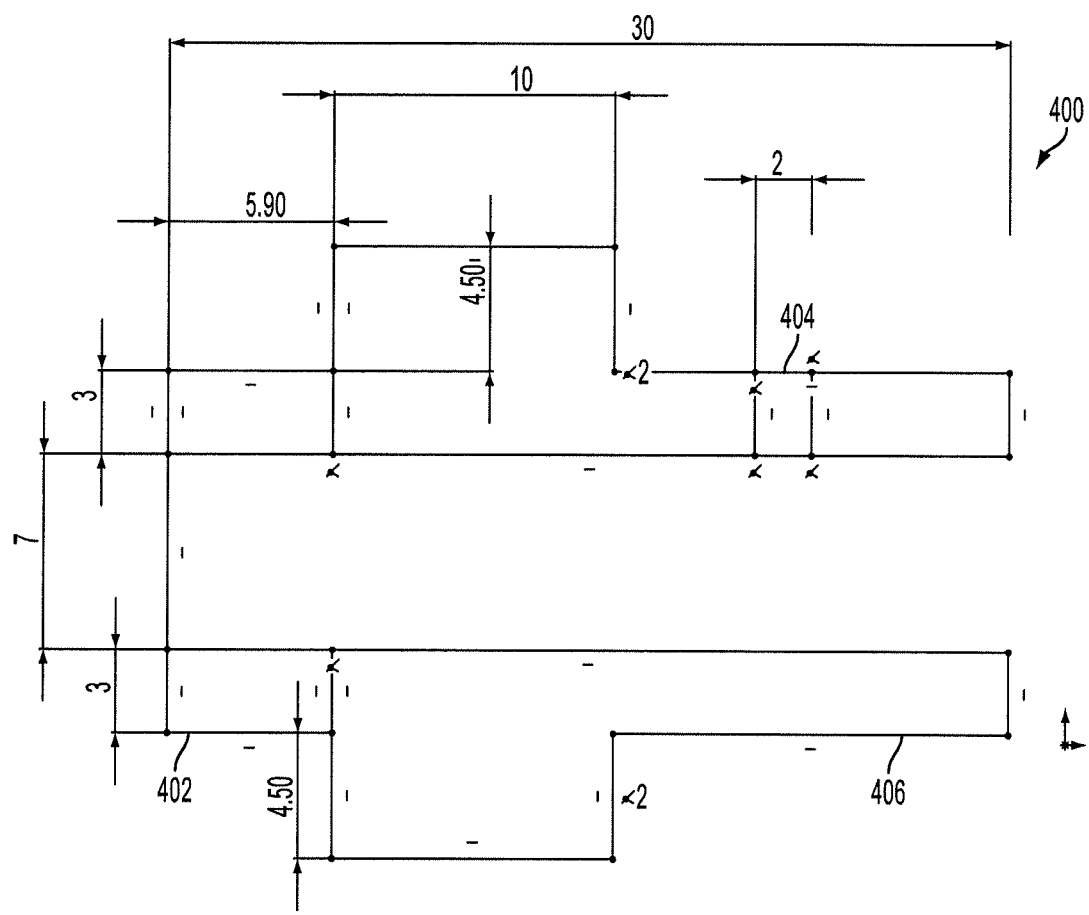
FIG. 6 is a drawing of an optical waveguide adapter according to an embodiment of the current invention.

In an embodiment of the current invention, the optical coupler 110 can also include a optical waveguide adapter 400 (FIG. 6) structured to receive and attach the optical waveguide 104 such that the proximal end 106 of the optical waveguide 104 is held fixed at a predetermined position relative to the optical waveguide adapter 400. (The dimensions in the example of FIG. 6 are in millimeters.) The optical waveguide adapter 400 has an end 402 adapted to be attached within the optical coupler 110 at a position that enhances efficiency of coupling light from the light source 102 into the optical waveguide 104. The optical waveguide 104 can be attached to the optical waveguide adapter 400 in numerous different ways depending on the application. For example, in some applications, such as for use in surgical or other medical applications, it may be desirable to remove the optical waveguide 104 from the optical waveguide adapter 400 after use. For example, the optical waveguide 102 may be a disposable optical waveguide in some applications. In the example of FIG. 6, a through hole 404 is provided in attachment end 406 such that a screw can clamp down on the optical waveguide 104. Another example for a releasable connection could include a snap attachment structure so that the optical waveguide 104 can be snapped to the optical waveguide adapter 400 and then simply pulled apart after use. Numerous variations of attachment mechanisms could be used. In other embodiments, the optical waveguide 104 could be more permanently attached.

In the example of FIG. 6, optical waveguide adapter 400 is for a 7 mm optical pipe. The 5.9 mm long head is inserted with screw thread so that it can be screwed into the elliptical cavity precisely at the focal point of the elliptical mirror. On the surface of the adaptor, a threaded hole with a 2 mm diameter is used to fix the light pipe in the adaptor.

Figure 7:
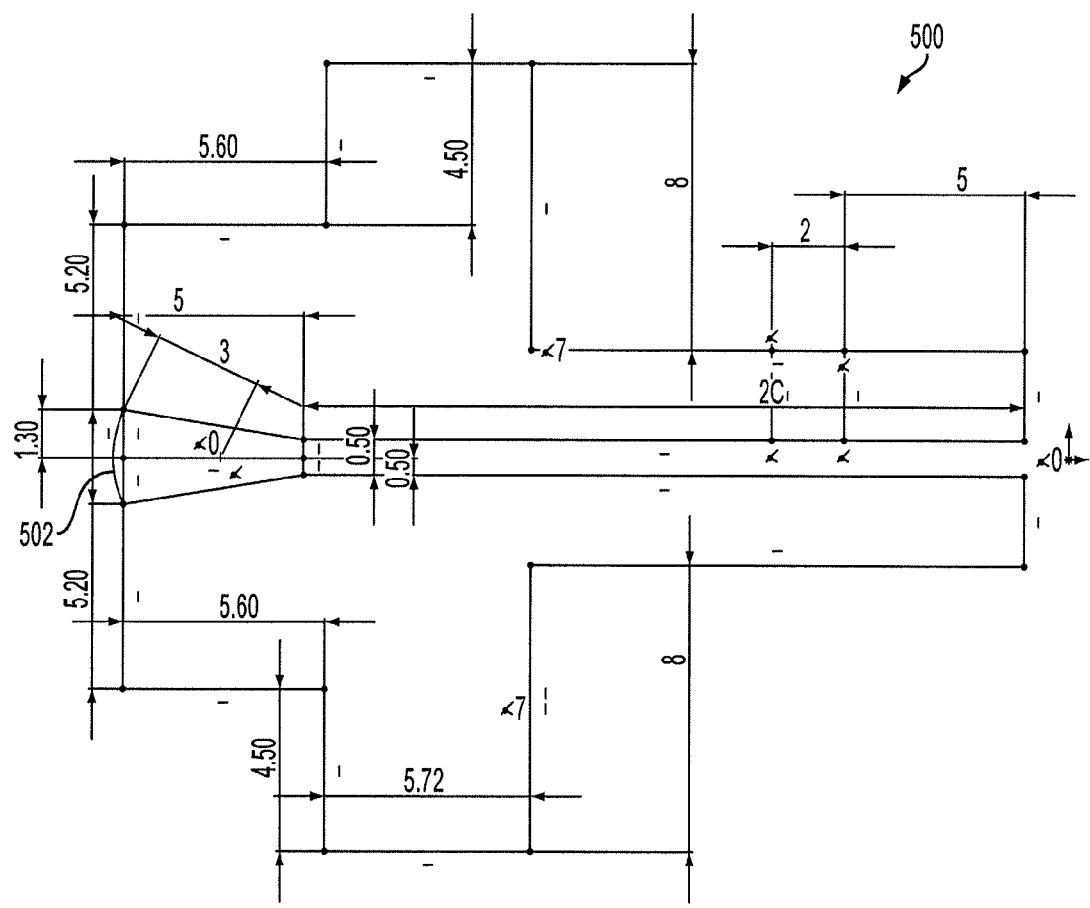
FIG. 7 is a drawing of an optical waveguide adapter according to another embodiment of the current invention.

FIG. 7 shows another embodiment of an optical waveguide adapter 500. The dimensions in the example of FIG. 7 are in millimeters. The optical waveguide adapter 500 is similar to that of FIG. 6, except it includes a lens component 502. This can be useful for narrow optical waveguides, such as narrow optical fibers of about 1 mm diameter. The lens 502 is illustrated as a refractive lens in FIG. 7; however, the invention is not limited to this particular example. The lens 502 could be a compound lens, a diffractive (Fresnel) lens, and/or a graded refractive index (GRIN) lens, for example.

In the example of FIG. 7, the 5.6 mm head is threaded so that it can be screwed into the elliptical mirror precisely. The lens structure is at the center of the front surface. The radius of the curvature is 3 mm and the aperture is 2.6 mm. The focal length of the lens is 5.3 mm. The lens is made of PMMA or other optical materials.

The optical waveguide 104 can be a multimode optical fiber, a bundle of optical fibers and/or a hollow optical fiber, for example, according to some embodiments of the current invention.

Illumination systems according to some embodiments of the current invention can provide compact designs. For example, the elliptical cavity can be mounted in a small box as small as (L=71 mm H=50 mm W=50 mm). Light source adaptors can be screwed into the light source hole and light pipe adaptors can be screwed into the light pipe hole precisely to the optimal position for high coupling efficiency without complicated adjustments. The wires coming out from the light source adaptor can be connectors to the LED drivers controlled either manually or by a computer. A light pipe can be changed easily by loosening the screw in the light pipe adaptor.

EXAMPLES

The table below provides an example of some results for a 7 mm optical fiber with four LEDS, one in the green, one in the red, one in the near infrared and one in the infrared regions of the spectrum. The results show high efficiency over a broad range of wavelengths. However, the efficiency decreases with smaller light pipes and for about a 1 mm light pipe the efficiency is approximately 19% over a broad range of visible wavelength and near-IR.

Figure 8:
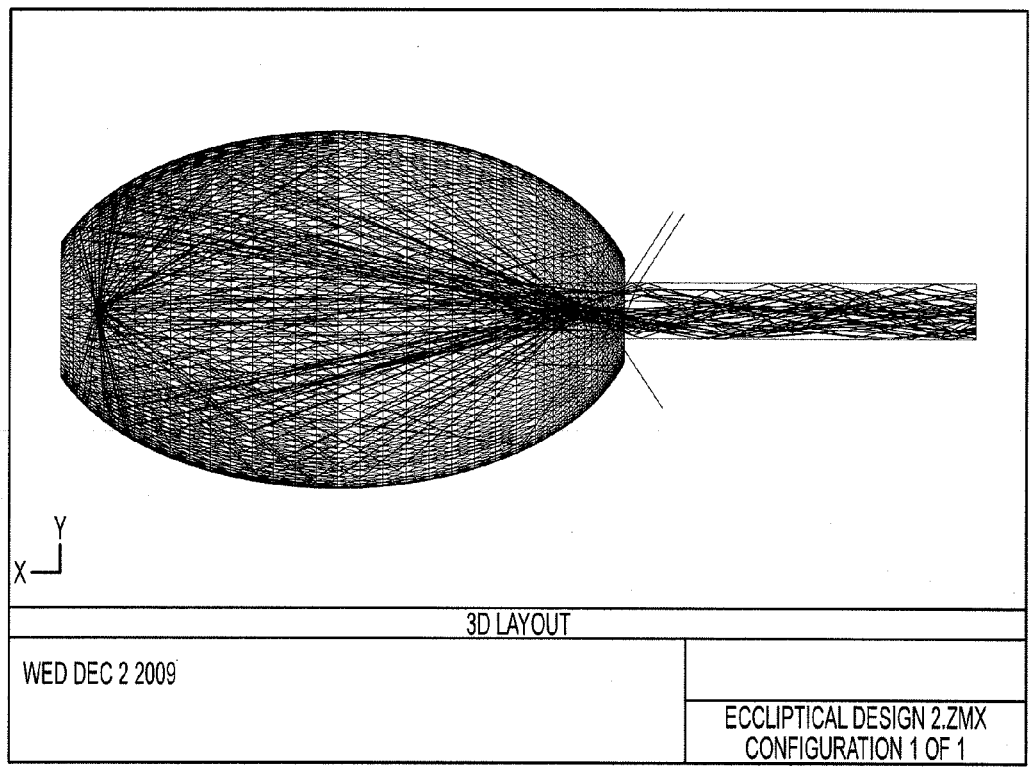
FIG. 8 shows simulation results for an illumination system according to an embodiment of the current invention.

In FIG. 8, the LED light source is modeled by a simulation. The total power is 3 w (each color is 1 w). The light source is placed at the focal point of the elliptical cavity. The front face of the light pipe is placed at the other focal point of the elliptical cavity. The detector is placed at the end of the light pipe for the power measurement.

| | Efficiency | | | |
|---|---|---|---|---|
| Wavelength (nm) | 532 | 632 | 830 | 1100 |
| Input Power (mW) | 144.7 | 92.2 | 50.5 | 153.6 |
| Output Power (mW) | 126 | 79 | 44.6 | 134.5 |
| Efficiency (%) | 87.1 | 85.7 | 88.3 | 87.8 |

Figure 9:
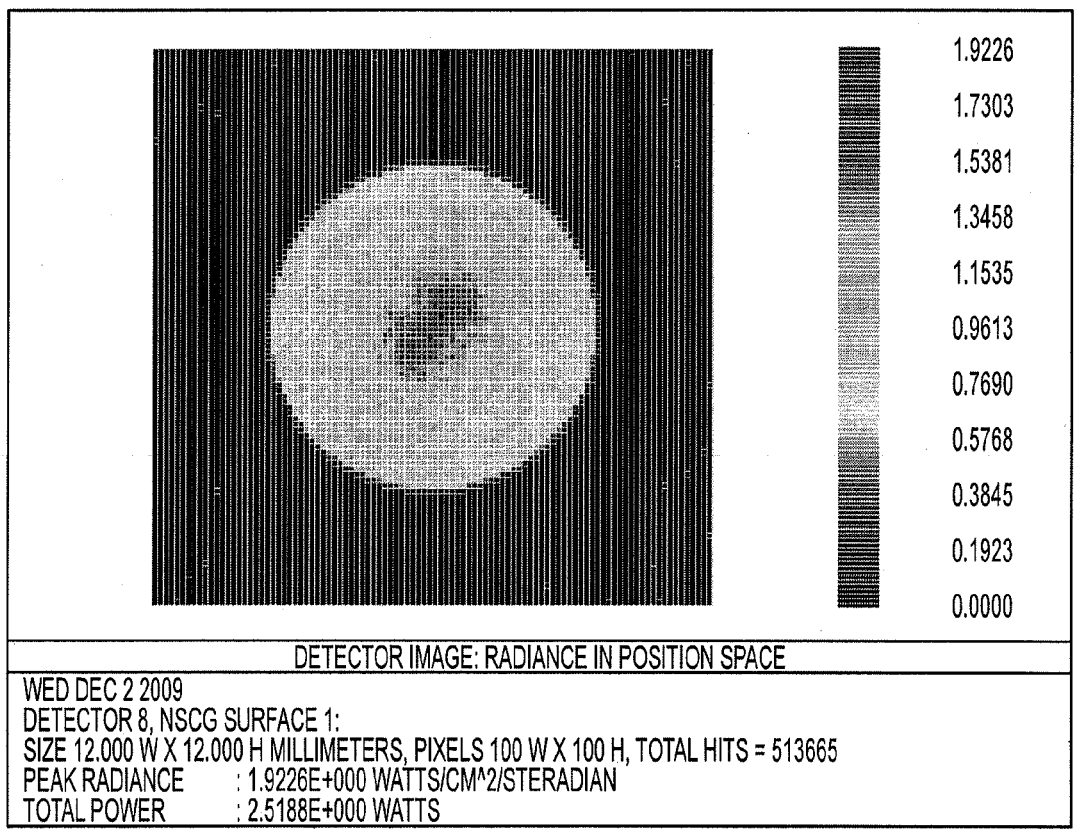
FIG. 9 shows the detector image for a 7 mm light pipe corresponding to the example of FIG. 8.

FIG. 9 shows the detector image for a 7 mm light pipe. We can see the efficiency is about 84%; most of the light has been coupled into the light pipe.

Figure 10:
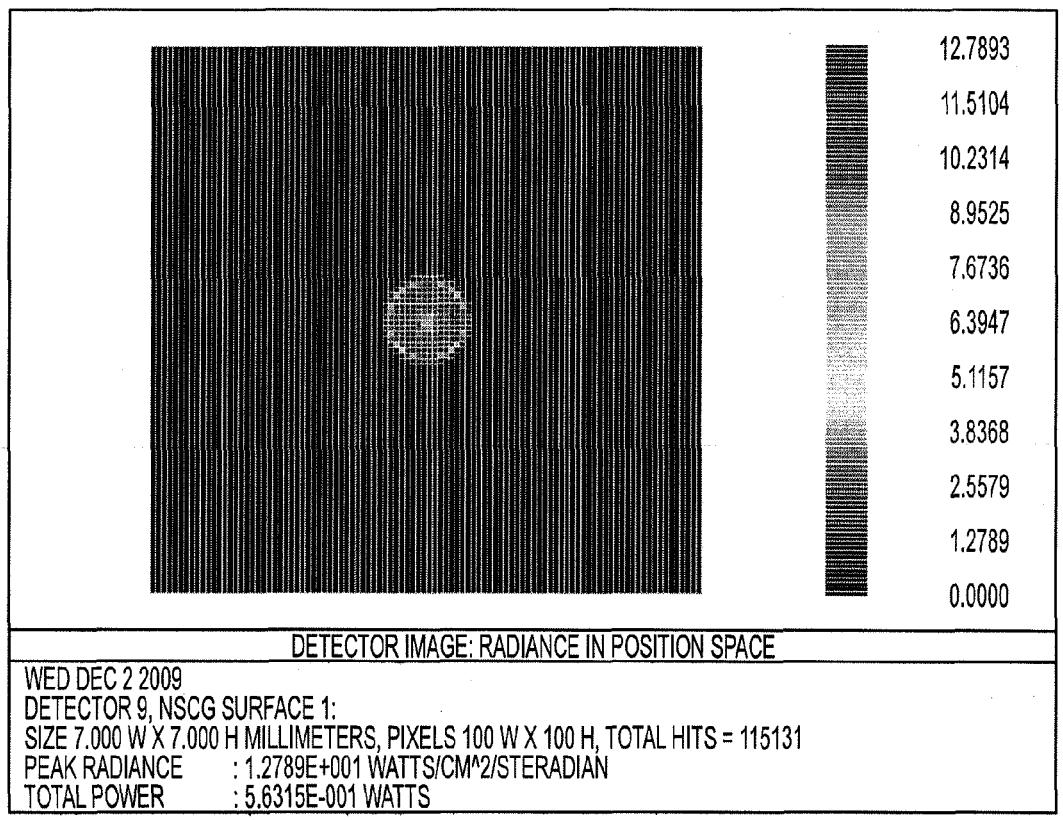
FIG. 10 shows the detector image for a 1 mm light pipe corresponding to the example of FIG. 8.

FIG. 10 shows the detector image for a 1 mm light pipe. The basic layout for the 1 mm light pipe is the same as the 7 mm light pipe. The difference is the light pipe adaptor. We put a lens structure in front of the adaptor to gather as much light as possible. The total efficiency is about 19%.

The embodiments discussed in this specification are intended to explain concepts of the invention. However, the invention is not intended to be limited to the specific terminology selected and the particular examples described. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. An illumination system, comprising:
   a light source;
   an optical waveguide having a proximal end and a distal end, said proximal end being arranged to receive light from said light source and said distal end being suitable to illuminate an object of interest; and
   an optical coupler constructed and arranged to couple light from said light source into said optical waveguide,
   wherein said optical coupler comprises a reflective surface that reflects at least some light diverging from said light source to be coupled into said optical waveguide, and
   wherein said optical coupler is structured to couple light from said light source into said optical waveguide with an efficiency of at least 85% when said optical waveguide is at least 7 mm wide and an efficiency of at least 19% when said optical waveguide is about 1 mm wide.

2. An illumination system according to claim 1, wherein said reflective surface is a mirror surface that provides specular reflection.

3. An illumination system according to claim 1, wherein said light source comprises a light emitting diode (LED).

4. An illumination system according to claim 1, wherein said light source comprises a plurality of light emitting diodes.

5. An illumination system according to claim 4, wherein said plurality of light emitting diodes includes at least a red LED, a green LED and a blue LED to provide substantially white light illumination.

6. An illumination system according to claim 1, wherein said optical waveguide is at least one of a multimode optical fiber, a bundle of optical fibers or a hollow optical fiber.

7. An illumination system according to claim 1, wherein said reflective surface has a shape such that light that diverges from a source region is redirected to converge in a coupling region.

8. An illumination system according to claim 7, wherein said reflective surface is approximately an ellipsoidal surface.

9. An illumination system according to claim 1, wherein said optical coupler has a surface defining a chamber therein comprising a coating of a reflective material, wherein said reflective surface is at least a portion of said coating.

10. An illumination system according to claim 1, wherein said optical coupler comprises a solid core defining a surface and layer of a reflective material disposed on said surface of said solid core, wherein said reflective surface is at least a portion of said layer of reflective material.

11. An illumination system according to claim 1, wherein said optical coupler further comprises a light source adapter having an LED attachment portion adapted to receive and electrically connect a plurality of LEDs, wherein said light source adapter is structured to be attached within said optical coupler at a position that enhances efficiency of coupling light from said plurality of LEDs into said optical waveguide.

12. An illumination system according to claim 1, wherein said optical coupler further comprises an optical waveguide adapter structured to receive and attach said optical waveguide such that said proximal end of said waveguide is held fixed at a predetermined position relative to said optical waveguide adapter, wherein said optical waveguide adapter has an end adapted to be attached within said optical coupler at a position that enhances efficiency of coupling light from said light source into said optical waveguide.

13. An illumination system according to claim 12, wherein said waveguide adapter is structured such that said optical waveguide can be detached after use.

14. An illumination system according to claim 12, wherein said waveguide adapter further comprises a lens to enhance efficiency of coupling light from said light source into said optical waveguide.

15. An optical coupler for an illumination system, comprising:
a reflective surface;
a light source attachment portion structured to receive and electrically connect a light-emitting diode (LED) and hold said LED substantially in a predetermined position relative to said reflective surface; and
an optical waveguide attachment portion adapted to receive an optical waveguide and hold an end of said optical waveguide substantially in a predetermined position relative to said reflective surface,
wherein said reflective surface reflects at least some light diverging from said LED to be coupled into said optical waveguide, and
wherein said optical coupler is structured to couple light from said LED into said optical waveguide with an efficiency of at least 85% when said optical waveguide is at least 7 mm wide and an efficiency of at least 19% when said optical waveguide is about 1 mm.

16. An optical coupler according to claim 15, wherein said light source attachment portion is structured to receive and electrically connect a plurality of LEDs and hold said plurality of LEDs substantially in a predetermined position relative to said reflective surface.

17. An optical coupler according to claim 16, wherein said plurality of LEDs includes at least a red LED, a green LED and a blue LED to provide substantially white light illumination.

18. An optical coupler according to claim 15, wherein said reflective surface is a mirror surface that provides specular reflection.

19. An optical coupler according to claim 15, wherein said reflective surface has a shape such that light that diverges from said LED while in operation is redirected to converge at said end of said optical waveguide.

20. An optical coupler according to claim 15, wherein said reflective surface is approximately an ellipsoidal surface.

21. An optical coupler according to claim 15, wherein said optical coupler has a surface defining a chamber therein comprising a coating of a reflective material, wherein said reflective surface is at least a portion of said coating.

22. An optical coupler according to claim 15, wherein said optical coupler comprises a solid core defining a surface and layer of a reflective material disposed on said surface of said solid core, wherein said reflective surface is at least a portion of said layer of reflective material.

23. An optical coupler according to claim 15, wherein said light attachment portion is adapted to receive and electrically connect a plurality of LEDs, wherein said light attachment portion is structured to be attached within said optical coupler at a position that enhances efficiency of coupling light from said plurality of LEDs into said optical waveguide.

24. An optical coupler according to claim 15, wherein said optical coupler further comprises a waveguide adapter structured to receive and attach said optical waveguide such that said proximal end of said waveguide is held fixed at a predetermined position relative to said waveguide adapter while in use, wherein said waveguide adapter has an end adapted to be attached within said optical coupler at a position that enhances efficiency of coupling light from said light source into said optical waveguide.

25. An optical coupler according to claim 24, wherein said waveguide adapter is structured such that said optical waveguide can be detached after use.

26. An optical coupler according to claim 24, wherein said waveguide adapter further comprises a lens to enhance efficiency of coupling light from said light source into said optical waveguide.

* * * * *